United States Patent
Atedgi et al.

(10) Patent No.: US 9,922,133 B2
(45) Date of Patent: Mar. 20, 2018

(54) LIVE TOPOLOGICAL QUERY

(75) Inventors: Einat Atedgi, Ramat-Gan (IL); Arik Sityon, Ganne Tiqwa (IL); Eyal Regev, Giva'atayim (IL)

(73) Assignee: EntIT Software LLC, Sunnyvale, CA (US)

( * ) Notice: Subject to any disclaimer, the term of this patent is extended or adjusted under 35 U.S.C. 154(b) by 891 days.

(21) Appl. No.: 13/448,173

(22) Filed: Apr. 16, 2012

(65) Prior Publication Data
US 2013/0275410 A1    Oct. 17, 2013

(51) Int. Cl.
*G06F 7/00* (2006.01)
*G06F 17/30* (2006.01)

(52) U.S. Cl.
CPC .............. *G06F 17/30958* (2013.01)

(58) Field of Classification Search
None
See application file for complete search history.

(56) References Cited

U.S. PATENT DOCUMENTS

| | | | | |
|---|---|---|---|---|
| 6,219,663 | B1 * | 4/2001 | Baxter | G06F 17/30607 |
| 6,973,457 | B1 * | 12/2005 | Bastawala | G06F 17/3041 |
| | | | | 707/770 |
| 7,805,463 | B2 | 9/2010 | Bevan et al. | |
| 8,601,025 | B1 * | 12/2013 | Shajenko | G06F 17/30958 |
| | | | | 707/720 |
| 2004/0210537 | A1 * | 10/2004 | Grubb | G06Q 10/08 |
| | | | | 705/80 |
| 2006/0136402 | A1 | 6/2006 | Lee | |
| 2006/0271557 | A1 * | 11/2006 | Harward | G06F 9/52 |
| 2007/0294237 | A1 | 12/2007 | John et al. | |
| 2008/0059454 | A1 * | 3/2008 | Andrieu | G06F 17/30864 |
| 2008/0177722 | A1 * | 7/2008 | Lohman et al. | 707/4 |
| 2009/0113412 | A1 * | 4/2009 | Shribman | G06F 17/30067 |
| | | | | 717/170 |
| 2009/0119279 | A1 * | 5/2009 | Goyal | H04L 63/1408 |
| 2009/0240682 | A1 * | 9/2009 | Balmin et al. | 707/5 |
| 2010/0185658 | A1 | 7/2010 | Kowalski | |
| 2011/0238658 | A1 | 9/2011 | Schimmelpfeng | |
| 2011/0295841 | A1 * | 12/2011 | Sityon et al. | 707/722 |

OTHER PUBLICATIONS

Kriegel, H.P. et al.; "Potentials for Improving Query Processing in Spatial Database Systems"; 1993; http://epub.ub.uni-muenchen.de/4239/1/19.pdf.

Yue, F. et al.; "A Divide-and-conquer Implementation of Three Sequence Alignment and Ancestor Inference"; Nov. 2-4, 2007; pp. 143-150; http://www.cse.sc.edu/~jtang/Bl.

(Continued)

*Primary Examiner* — Thu Nga Nguyen

(57) ABSTRACT

A method for performing a live topological query includes, with a querying application, using a query graph to create a live topological query result from a database storing a full structure graph while not storing an entirety of the query result in a cache memory. The method further includes, in response to detecting a change within full structure graph, performing a calculation to determine whether the change is relevant to the query result, and notifying the querying application of a relevant change to the query result without relying on a fully cached copy of the query result.

19 Claims, 7 Drawing Sheets

(56) References Cited

OTHER PUBLICATIONS

Baralis, E. et al., "Materialized Views Selection in a Multidimensional Database," (Research Paper), VLDB, vol. 97, 1997, 10 pages, available at http://www.informatik.uni-jena.de/dbis/lehre/ss2005/sem_dwh/lit/BPT97.pdf.
Garrod, C. et al., "Scalable Query Result Caching for Web Applications," (Research Paper), Proceedings of the VLDB Endowment 1.1, 2008, pp. 550-561, available at https://www.akamai.com/cn/zh/multimedia/documents/technical-publication/scalable-query-result-caching-for-web-applications-technical-publication.pdf.
Lieuwen, D. F. et al., "The Ode Active Database: Trigger Semantics and Implementation," (Research Paper), Data Engineering, 1996 pp. 412-420, available at http://citeseerx.ist.psu.edu/viewdoc/download?doi=10.1.1.52.2765&rep=rep1&type=pdf.
Paton, N. W. et al., "Active Database Systems," (Research Paper), ACM Computing Surveys (CSUR) 31.1, 1999, pp. 63-103, available at http://ww.w.workflowpatterns.com/documentation/documents/p63-paton.pdf.

* cited by examiner

700

With a querying application, use a query graph to create a live topological query result from a database storing a full structure graph while not storing an entirety of the query result in a cache memory
(block 702)

In response to detecting a change within the full structure graph, perform a calculation to determine whether the change is relevant to the query result
(block 704)

Notify the querying application of a relevant change to the query result without relying on a fully cached copy of the query result
(block 706)

*Fig. 7*

LIVE TOPOLOGICAL QUERY

BACKGROUND

Many complex structures can be represented using graph theory. In graph theory, a graph includes a set of nodes and a set of vertices that connect the nodes to each other. For example, one type of complex structure that can be represented through a graph is an Information Technology (IT) infrastructure. An IT infrastructure includes several physical computing systems and a number of services provided by those systems. When using graphs to topologically represent an IT infrastructure, the nodes are used to represent IT entities within the IT infrastructure and the vertices between the nodes are used to represent the relationships between those entities When representing a complex structure graphically, it is often useful to perform queries on that structure. One type of query is a topological query. In a topological query, the query input itself is a graph representing a pattern within the full graph structure. The query engine then searches the entire full graph structure to find similar structures. These similar structures found within the full graph structure are then returned to the application that requested the query.

In some cases, it is useful to define what is referred to as a live topological query. Using the IT infrastructure graph as an example, live topological queries involve notifications relating to changes within the IT infrastructure that affect the query result. These notifications are then picked up by listeners that are set to keep a specific query result up-to-date while ongoing changes take place within the IT infrastructure. This is typically done by caching the query result within a cache memory. As changes are made within the IT infrastructure such as the addition and removal of new entities and relationships, these changes are compared with the cached result to determine whether a change is relevant to the live query. If so, then the cache is updated accordingly and the querying application is notified of the change. However, due to the rapidly expanding complexity and size of IT infrastructures, the amount of cache space used to store a full query result can become rather large, consuming large amounts of cache memory.

BRIEF DESCRIPTION OF THE DRAWINGS

The accompanying drawings illustrate various examples of the principles described herein and are a part of the specification. The drawings are merely examples and do not limit the scope of the claims.

FIG. 7 is a flowchart showing an illustrative method for performing a live topological query, according to one example of principles described herein.

Throughout the drawings, identical reference numbers designate similar, but not necessarily identical, elements.

DETAILED DESCRIPTION

As mentioned above, live topological queries can consume large amounts of cache memory as query results on large and complex full graph structures can be quite large. In the example of a full graph structure being used to represent an IT infrastructure, the result of a live query may include millions of IT entities. IT entities include computing systems, computing applications and other aspects of an IT infrastructure.

In light of this and other issues, the present specification discloses methods and systems for performing live topological queries without having to entirely rely on a cached result. Thus, the entire query result does not have to be stored in the cache memory. Specifically, in response to changes within the IT infrastructure, various calculations can be performed using the information from these changes to determine whether a change is relevant to the live query result. Relevant changes can then be sent to the application that listens to that live query.

Through use of methods and systems embodying principles described herein, various applications that utilize live topological queries can do so without building up large amounts of data in a cache memory. These methods and systems allow for more efficient use of the cache memory. Additionally, these methods and systems allow for efficient topological queries to be performed on larger and more complex graph infrastructures without consuming too much cache memory.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with that example is included as described, but may not be included in other examples.

Figure 1:
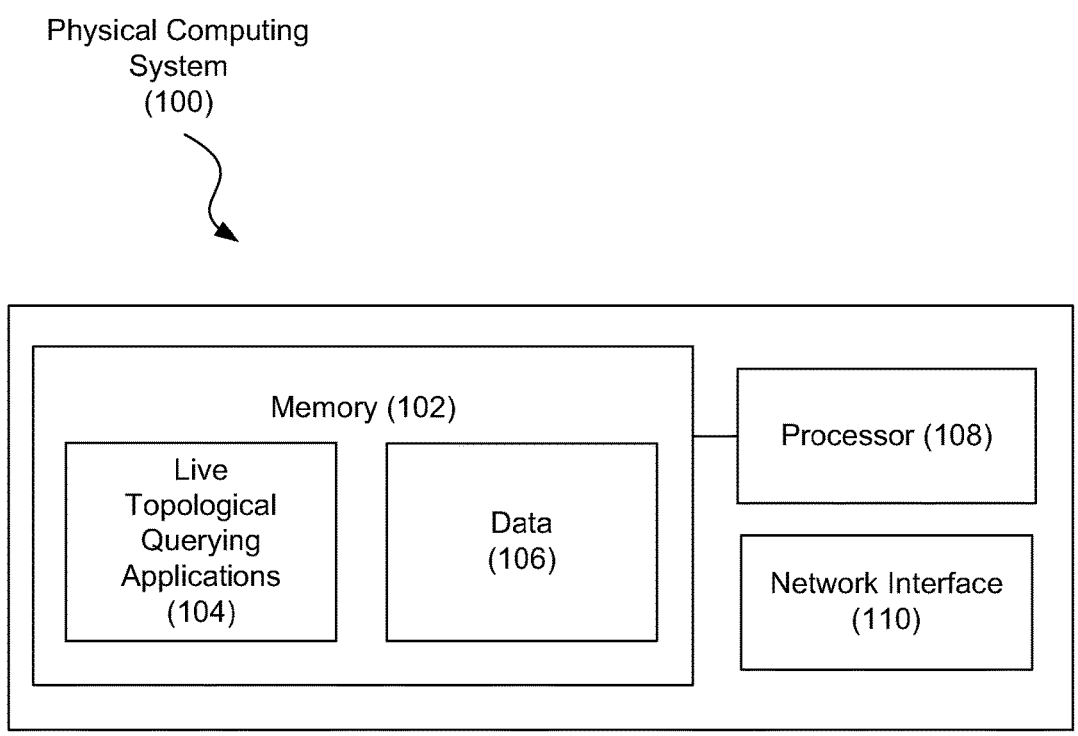
FIG. 1 is a diagram showing an illustrative physical computing system, according to one example of principles described herein.

Referring now to the figures, FIG. 1 is a diagram showing an illustrative physical computing system (100) that can be used to run an application that requests a live topological query. Additionally, or alternatively, the physical computing system (100) may be used to store at least part of a database that represents an IT infrastructure topologically using graph theory. According to certain illustrative examples, the physical computing system (100) includes a memory (102) having software and data (106) stored thereon. Throughout this specification, the term software refers to any machine readable instructions. The physical computing system (100) also includes a processor (108) and a network interface (110).

There are many types of memory (102) available. Some types of memory, such as solid state drives, are designed for storage. These types of memory typically have large storage volume but relatively slow performance. Other types of memory, such as those used for Random Access Memory (RAM), are optimized for speed and are often referred to as "working memory." The various forms of memory may store information in the form of software and data (106).

The physical computing system (100) also includes a processor (108) for executing the software and using or updating the data (106) stored in memory (102). The software may include an operating system. An operating system allows other applications to interact properly with the hardware of the physical computing system. Such other applications may include those that utilize live topological queries. Such live topological querying applications (104) may include a Configuration Management System (CMS) and Business Service Management (BSM).

The type of data (106) stored in memory may depend on the applications running on the computing system (100). If the computing system is one that is running a live topological querying application (104), then the data (106) will include data that relates to those live topological queries. If the computing system is a server storing a database, then the data (106) may include part of the database that stores the IT infrastructure that is represented topologically.

A network interface (110) is used to allow the physical computing system (100) to communicate with other physical computing systems. Specifically, the network interface allows the computing system (100) to coordinate processing with other computing systems and to transmit data to other locations for storage. Various transfer protocols may be used to transfer this data. The network interface (110) may allow for a variety of physical transmissions such as coaxial, Ethernet, fiber-optic, and wireless.

Figure 2:
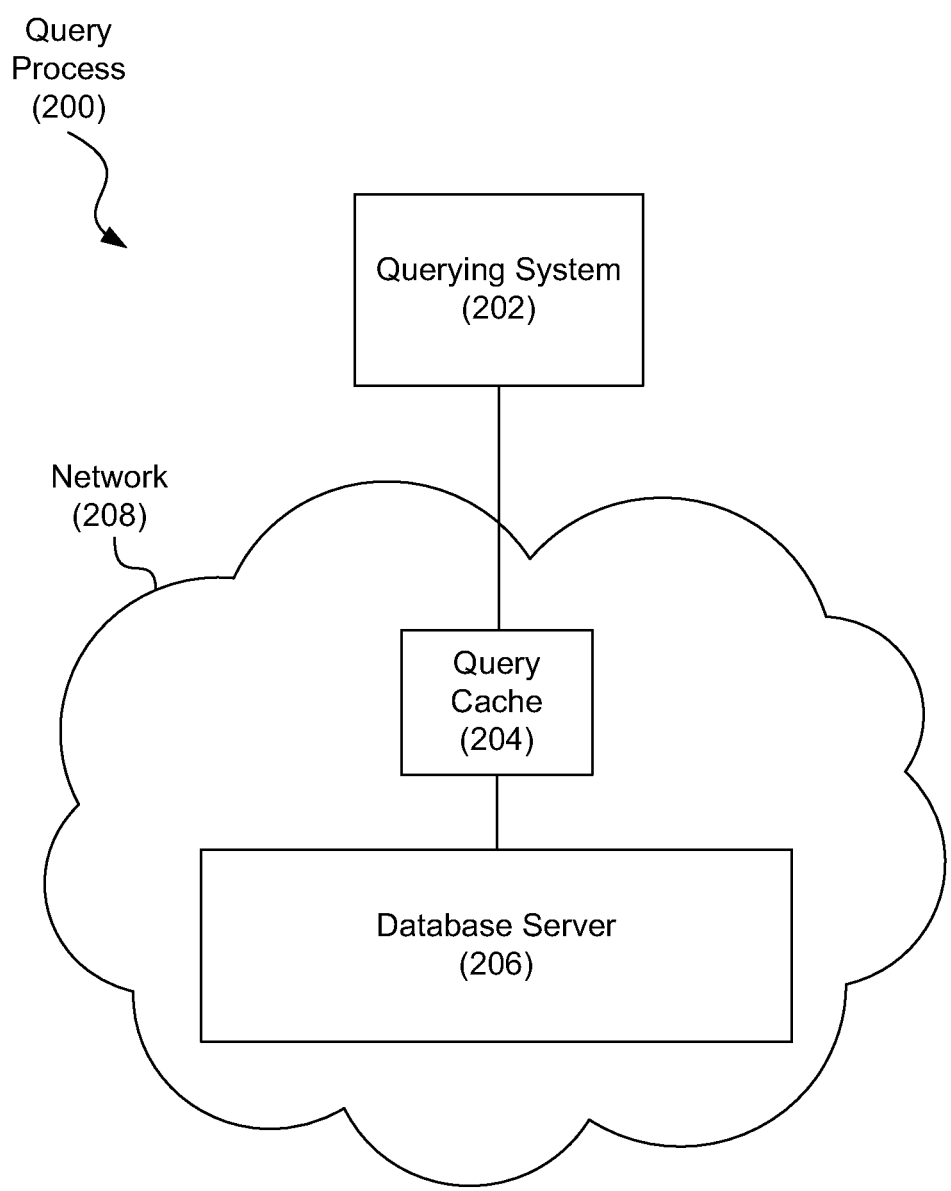
FIG. 2 is a diagram showing an illustrative query process, according to one example of principles described herein.

FIG. 2 is a diagram showing an illustrative query process (200). According to certain illustrative examples, a querying system (202) initiates a live topological query. For illustrative purposes, this specification will describe a full graph structure that is used to represent an IT infrastructure. However, systems embodying principles describe herein may be used on graph structures that represent other concepts or entities. The database that represents the IT infrastructure as a graph is typically very large. As such, it is typically stored on a database server (206) accessible over a network (208). In order to create and maintain the database representing the IT infrastructure, a discovery process runs to detect the nature of the IT infrastructure and to detect any changes involving previously discovered entities and relationships.

The query result from a live topological query is typically stored in a query cache (204). The query cache memory (204) may be associated with the database server. Alternatively, the query cache memory (204) may be a separate physical computing system used specifically as a repository for caching a query result. Caching the query result allows for faster determination of which changes are relevant to the query result.

Cache systems are often used when accessing information from a relatively distant memory storage location. The cache system stores a copy of the retrieved information. The cache system has a faster access time than the original storage location and thus allows the system requesting the data within storage to re-access that data faster than would otherwise be without the cache system. In this case, the query cache (204) stores the result of the query so that the querying system can access the query result data faster than it would take to access it from the database. As mentioned above, however, due to the large and complex nature of many IT infrastructures, storing the result in a cache memory can consume large amounts of that memory.

Figure 3A:
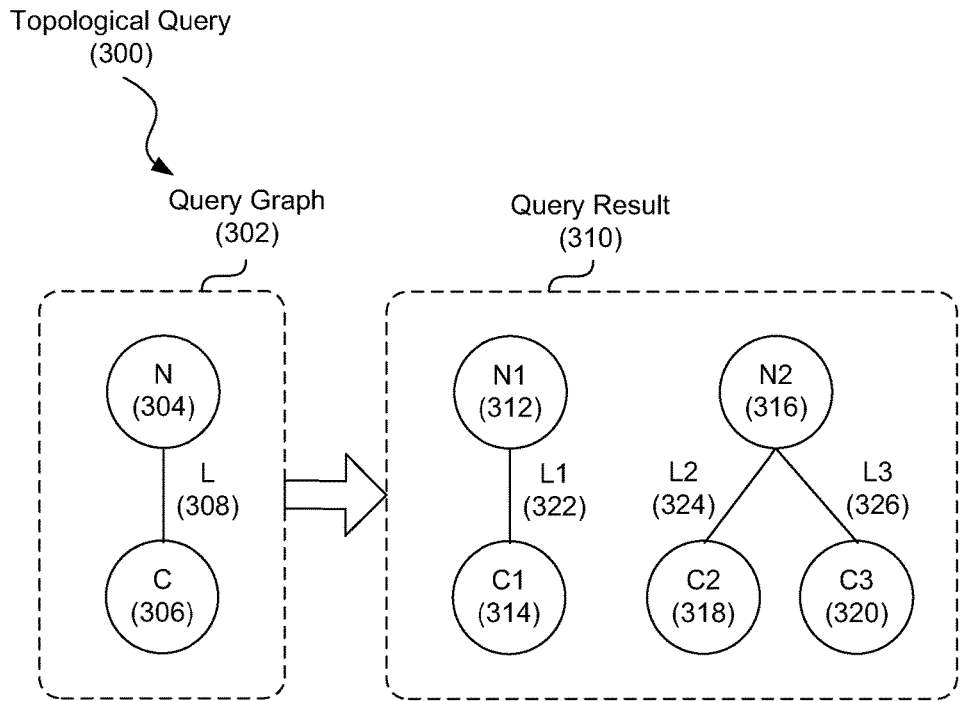
FIG. 3A is a diagram showing an illustrative topological query process, according to one example of principles described herein.

FIG. 3A is a diagram showing an illustrative topological query process (300). As mentioned above, a topological query is one in which the query input is a graph itself. This graph will be referred to as the query graph (302). The result of a topological query will be referred to as the query result (310). The query result (310) thus represents a set of graph structures within the IT infrastructure graph that matches the query graph (302).

According to certain illustrative examples, the query graph (302) includes two nodes and one link connecting those two nodes. The first node N (304) represents a physical computing node. The second node C (306) represents a processor core. The link L (308) describes the relationship of the processor core to the physical computing node. For example, node N (304) may represent a specific type of physical computing node. Node C (306) may represent a specific type of processor core and link L (308) may represent a specific type of connection between a physical computing node and processor core.

The query result (310) illustrates an example of the structures found within the IT infrastructure graph that match those of the graph within the query input (302). In this example, N1 (312) is related to C1 (314) through L1 (322). Additionally, N2 (316) is related to C2 (318) and C3 (320) through L2 (324) and L3 (326) respectively. Each of these nodes and links matches that of the query graph (302). The result shown in FIG. 3A is for illustration purposes only. A practically implemented topological query would produce a significantly larger result.

Figure 3B:
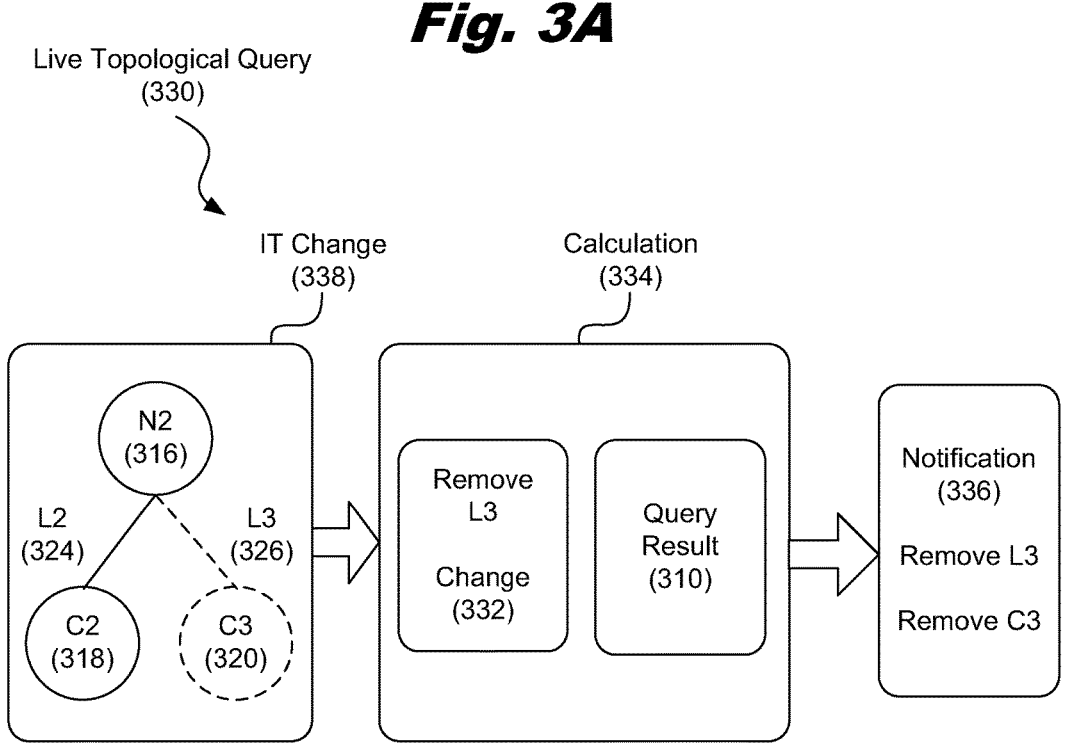
FIG. 3B is a diagram showing an illustrative live topological query process, according to one example of principles described herein.

FIG. 3B is a diagram showing an illustrative live topological query process. As mentioned above, a live topological query (330) is one in which the query result is updated regularly to match the many changes occurring within the IT infrastructure graph. The live topological query utilizes information obtained by the discovery process for the IT infrastructure to determine when changes have occurred within the IT infrastructure. In response to an IT infrastructure change (338), a calculation (334) is performed to determine whether the change (332) is relevant to the query result. If it is determined that the change is in fact relevant to the query result, then a notification (336) of such change can be published to a number of listeners associated with the live query.

For example, if it is determined by the discovery process that there has been a change in the IT infrastructure indicating that L3 (326) no longer exists, then the calculation will check the cached query result (310) to determine whether L3 (326) is within the cached query result (310). If L3 (326) is not within the cached query result, then no notification (336) to the listeners has to be published. But, if L3 (326) is in fact within the cached query result, then a notification (336) indicating such is published to the listeners.

As mentioned above, relying on a cached query result consumes a large amount of cache memory. In light of such issues, the present specification discloses methods for performing a live topological query (330) without relying entirely on a cached result. According to certain illustrative examples, the entire cached result is not stored in a cache system. Rather, in response to changes within the full graph structure, various methods and calculations are performed to determine whether those changes are relevant to the live query without relying on a cached query result.

In some cases, the calculations to determine whether an IT infrastructure change is relevant to a live query result can be quite complicated and process intensive if the result is not held in cache. In order to reduce the complexity and processing time overhead of performing such calculations, various techniques may be used. In one example, the listeners used to detect notifications of relevant changes within the IT infrastructure may be categorized by the type of changes for which they listen. A particular live topological query may then be associated with one or more of those listeners based on what types of changes are relevant to that query.

Figure 4:
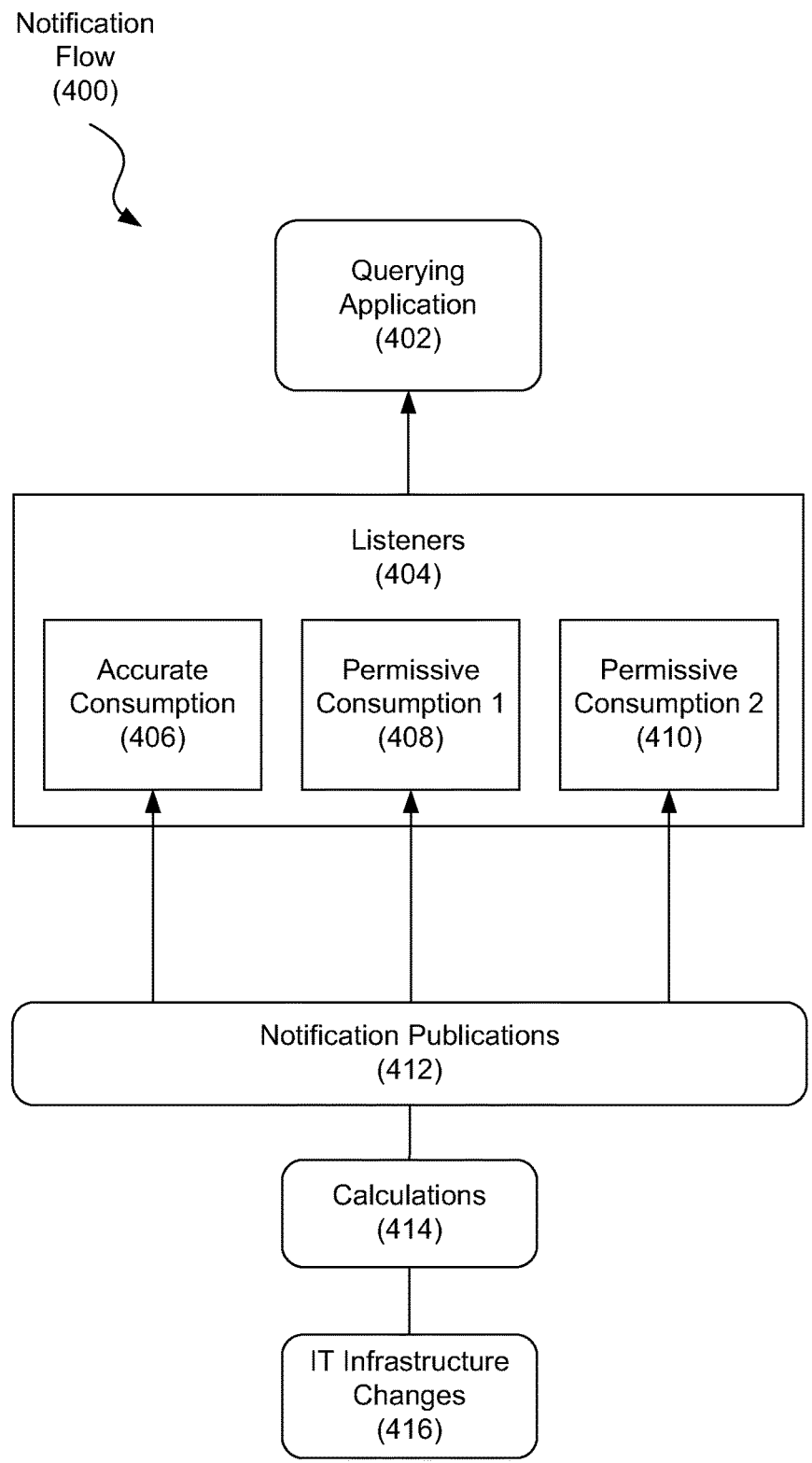
FIG. 4 is a diagram showing illustrative notification flow, according to one example of principles described herein.

FIG. 4 is a diagram showing illustrative notification flow (400). According to certain illustrative examples, a number of different types of listeners (404) are created. These listeners look for specific types of notifications of changes within the full graph structure and provide those changes to a querying application (402). In this example, there are three different types of listeners (404) that are used to detect different types of notification publications (412) resulting from the calculations (414) made in response to IT infrastructure changes (416) relevant to the query result. These different types are an accurate consumption listener (406), a first permissive consumption listener (408) and a second permissive consumption listener (410).

The accurate consumption listener (406) is designed to detect all types of changes within the IT infrastructure. The first permissive consumption listener (404) is designed to detect less than all types of changes within the IT infrastructure but detect more types of changes than the second permissive consumption listener (410). The second permissive consumption listener (410) is designed to detect the least number of types of changes.

With a set of different types of listeners available, different live queries can use different type of listeners. For example, some query applications do not have to distinguish between add and update notifications. Thus, a listener in such a querying application may be defined from the second permissive consumption listener type (410) as it has to listen for a small number of types of changes within the IT infrastructure. Calculations for a live query with permissive listeners may be able to be performed without relying on the cached result. Thus, by allowing some queries to not rely on the cached result, the allocated working memory can be significantly reduced.

An additional or alternative technique that may be used to avoid caching the result in a cache memory is to treat different types of graph structures differently. According to certain illustrative examples, the various types of query structures that can be used as query graphs can be categorized and afforded different treatment. For some types of structures, it is relatively easy to determine whether a change in the IT infrastructure will affect that query. Thus, by separating out such query graph structures, calculations for such structures can be performed with reduced use of working memory.

According to certain illustrative examples, the types of query graph structures may include simple structures and enriched structures. A simple structure is defined as one in which the calculations that are used to determine if a change is relevant to a query result of that structure is less than a predefined overhead complexity. An enriched structure is defined as a structure having a greater overhead complexity and that overhead complexity can be reduced by caching some of the nodes of that query structure in a cache memory.

Figure 5:
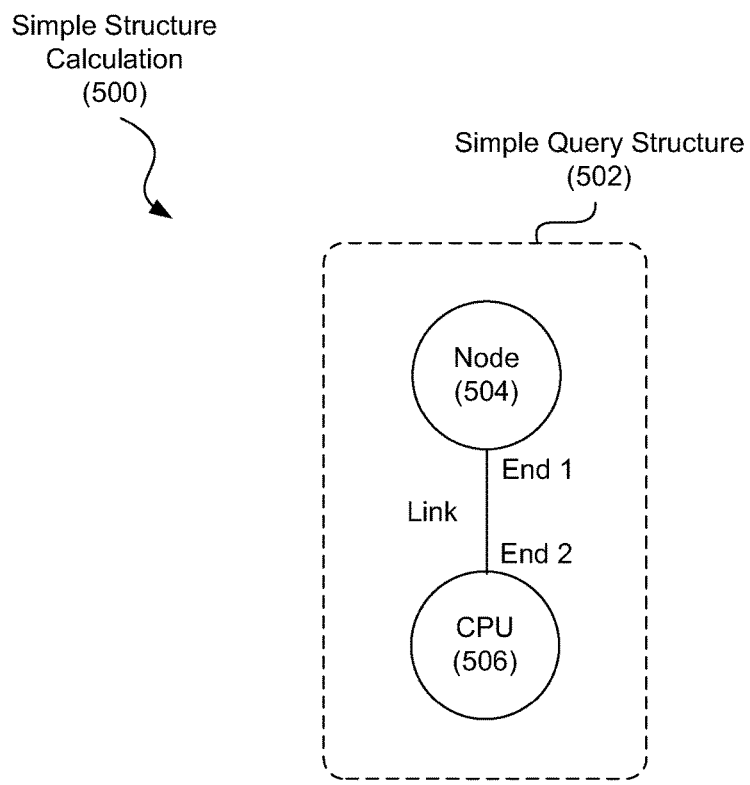
FIG. 5 is a diagram showing an illustrative simple structure calculation for non-cached live queries, according to one example of principles described herein.
Figure 5:
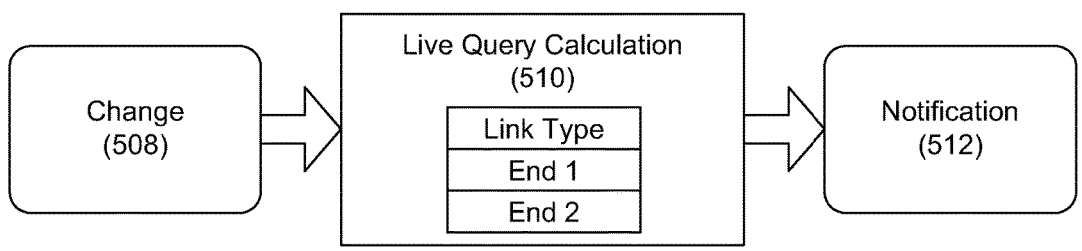

FIG. 5 is a diagram showing an illustrative simple structure calculation (500) for non-cached live queries. As the calculation for determining whether changes in the IT infrastructure are relevant has a lower overhead complexity for simple structures, queries with such structures can be treated in a specific manner. In response to a detection of a change (508) in the IT infrastructure, the live query calculations (510) can determine whether the change is relevant with a relatively small amount of processing overhead.

For example, if the change (508) indicates that a particular link no longer exists, then the calculation (510) will determine whether that link is relevant to the query result. It will be relevant if the link type of the change is the same link type within the query structure (502), and the type of nodes at both ends of the changed link are the same as the types of the ends of the simple query structure (502). In this case, if end 1 (504) of the changed link corresponds to a physical computing node, end 2 of the changed link corresponds to a CPU (508), and the changed link type is the same as the link type of the query sub-graph, then it can be determined that the change (508) is relevant. In such case, a notification (512) will be published to the listeners accordingly.

Figure 6A:
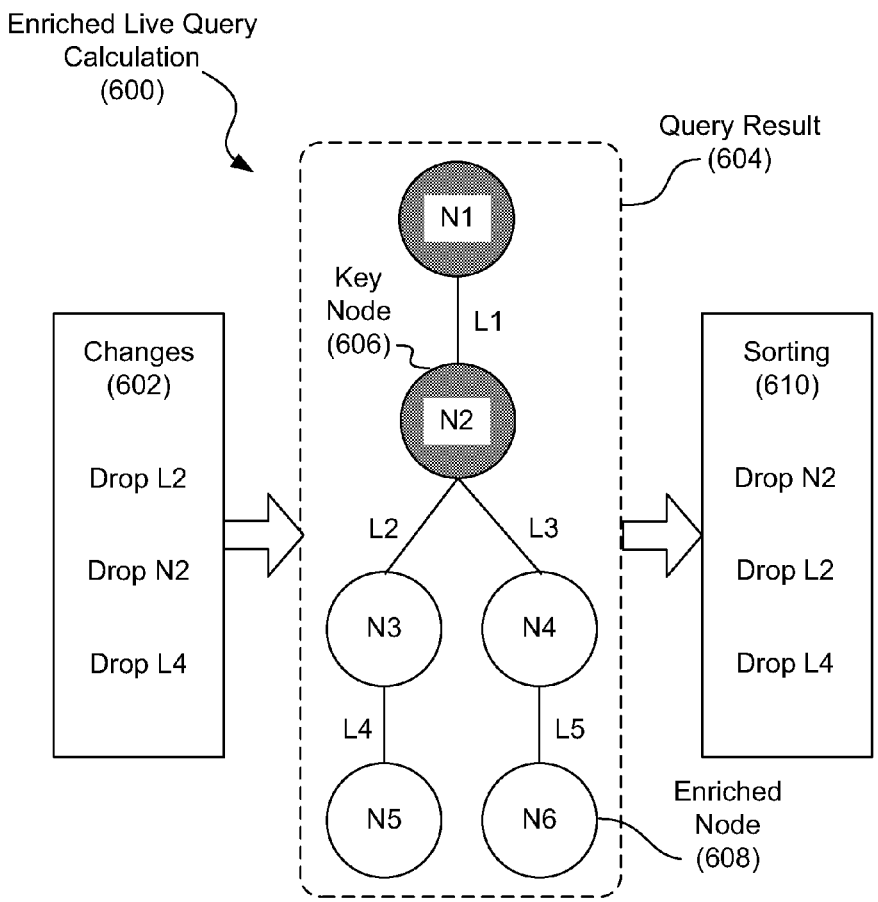
FIGS. 6A and 6B are diagrams showing an illustrative enriched structure calculation for non-cached live queries, according to one example of principles described herein.
Figure 6B:
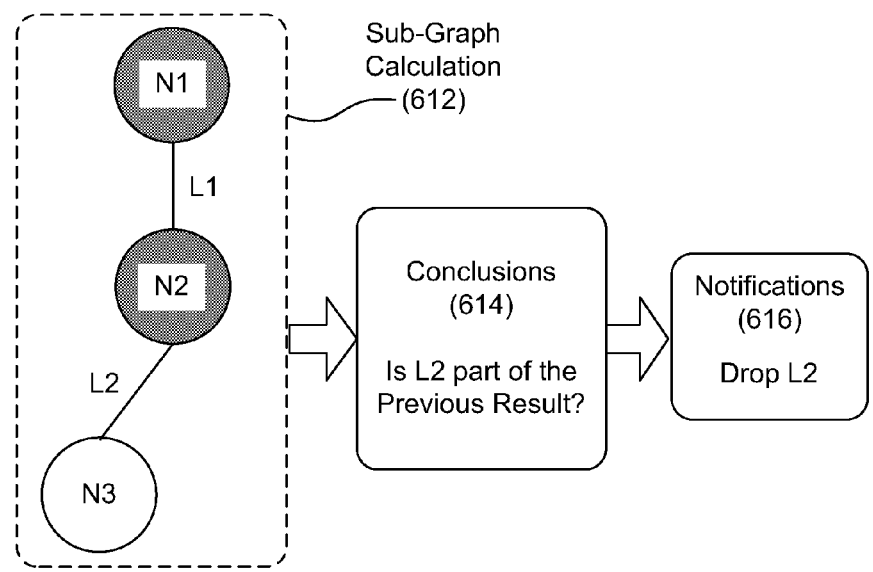

FIGS. 6A and 6B are diagrams showing an illustrative enriched structure calculation for non-cached live queries. As mentioned above, an enriched query structure is one which is more complicated than a simple structure in that the calculation to determine if changes are relevant to a query result from that enriched query structure require a time overhead complexity above a predefined threshold. According to certain illustrative examples, a number of nodes within the query graph may be defined as key nodes (606). The query result (604) relating to those key nodes are then stored within the cache memory. The query results relating to the non-cached nodes, which will be referred to as enriched nodes (608), will not be stored within the cache memory. Thus, a partial query result is stored in the cache memory.

With such a configuration, the calculations used to determine whether a change within the IT infrastructure is relevant to the query result can be performed with a lower processing overhead. The order in which the calculations for each change are performed is structured so that a particular calculation relies on a previous calculation. Specifically, changes to portions of the query result (604) that are closer to the top of the graph are performed before changes related to lower portions of the query result (604).

FIG. 6B is a diagram illustrating sub-graph calculations (612). According to certain illustrative examples, the enriched nodes (608) and associated links are divided up into sub-graphs and analyzed to determine if IT infrastructure changes are relevant to the query result. As mentioned above, the order of these sub-graph calculations is based on the sorting (610) of a set of changes from the top down. Using the results of these sub-graph calculations, and any previous sub-graph calculations performed in the sorting order, a conclusion (614) can be made to determine whether a change is relevant to the query result. The notifications (616) resulting from such conclusions can then be published accordingly.

In this example, the query result (604) includes two key nodes (606) indicated by the shaded circles. Additionally, the query result (604) includes two branches of enriched nodes (608). Thus, the query result (610) relating to N1, L1, and N2 are stored within the cache memory. When the discovery process determines that L2, N2, and L4 are no longer part of the IT infrastructure. These changes are first sorted according to their position within the query result. Thus, the order will be to calculate N2, L2, and then L4. When performing the sub-graph calculations in this order, it is determined that since N2 has been removed, and sub-graph calculations have returned no result for L2 and L4, then remove notifications is published for all events.

In some cases, a recursive function may be used to analyze complex query structures. The recursive function may divide the query graph into a set of sub-graphs and perform the same function on each of those sub-graphs to form a smaller set of sub-graphs. This recursive function continues until the sub-graphs are an appropriate form so as to perform the calculations to determine whether changes in the IT infrastructure are relevant to that sub-graph with relatively low processing overhead. If it is determined that the changes are relevant to a particular sub-graph, that determination will be provided to the calling function. This will work for all sub-graphs so that the final output of the recursive function indicates all the changes relevant to the query graph. These changes can then be published to the listeners so that the live query can be updated accordingly.

FIG. 7 is a flowchart showing an illustrative method for performing a live topological query with optimized memory consumption. According to certain illustrative examples, the method includes, with a querying application, using (block 702) a query graph to create a live topological query result from a database storing a full structure graph while not storing an entirety of the query result in a cache memory, in response to detecting a change within the full structure graph, performing (block 704) a calculation to determine whether the change is relevant to the query result, and notifying (block 706) the querying application of a relevant change to the query result without relying on a fully cached copy of the query result.

In conclusion, through use of methods and systems embodying principles described herein, various applications that utilize live topological queries can do so without building up large amounts of data in a cache memory within the IT infrastructure. These methods and systems allow for more efficient use of the cache memory. Additionally, these methods and systems allow for efficient topological queries to be performed on larger and more complex IT infrastructures without consuming too much cache memory.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A live topological query method performed by a physical computing system, the method comprising:
   with a querying application, using a query graph to create a live topological query result from a database storing a full structure graph while not storing an entirety of said query result in a cache memory;
   storing a first query result portion of said query result in said cache memory, and not storing a second query result portion of said query result in said cache memory, wherein said first query result portion relates to a first node in said query graph, and said second query result portion relates to a second, different node in said query graph;
   in response to detecting a change within said full structure graph, performing a calculation, based on said first query result portion stored in said cache memory and said second query result portion not stored in said cache memory, to determine whether said change is relevant to said query result;
   notifying said querying application of a relevant change to said query result without relying on a fully cached copy of said query result; and
   sorting nodes of said query graph into an order of said nodes, wherein performing said calculation comprises performing calculations in an order that corresponds to said order of said nodes, wherein sorting said nodes of said query graph comprises placing said first node before said second node in said order of said nodes.

2. The method of claim 1, wherein notifying said querying application comprises publishing changes relevant to said query result to a plurality of listeners.

3. The method of claim 2, wherein said plurality of listeners are to receive notifications for respective different types of changes within said full structure graph such that calculations associated with changes for said plurality of listeners can be performed without relying on a previous query result in said cache memory, wherein a first listener of said plurality of listeners listens for first type changes, and a second listener of said plurality of listeners listens for second type changes different from said first type changes.

4. The method of claim 1, wherein said query graph is a first query graph, the method further comprising:
   creating a second live topological query result in response to a second query graph, and
   determining whether said change is relevant to said second query graph, said determining whether said change is relevant to said second query graph is performed with an overhead below a predefined threshold without relying on any result stored in said cache memory.

5. The method of claim 4, wherein said first query graph is of a structure such that said calculation to determine whether said change is relevant to said first query graph involves a processing overhead complexity above said predefined threshold, and said processing overhead complexity is reduced by caching a subset of nodes within said query result for said first query graph.

6. The method of claim 1, wherein said full structure graph represents an Information Technology (IT) infrastructure in graph form.

7. The method of claim 6, further comprising, sorting a number of changes detected within said IT infrastructure from a top to a bottom of said query graph.

8. A computing system comprising:
   at least one processor;
   a non-transitory storage medium communicatively coupled to the at least one processor, the non-transitory storage medium comprising computer executable code that, when executed by the at least one processor, causes the at least one processor to:
   use a query graph to create a live topological query result from a database representing a full structure graph while not storing an entirety of said query result in a cache memory;
   store a first query result portion of said query result in said cache memory, and not store a second query result portion of said query result in said cache memory, wherein said first query result portion relates to a first node in said query graph, and said second query result portion relates to a second, different node in said query graph;
   in response to detecting a change within said full structure graph, perform a calculation, based on said first query result portion stored in said cache memory and said second query result portion not stored in said cache memory, to determine whether said change is relevant to said query result;
   notify a querying application of a relevant change to said query result without relying on a fully cached copy of said query result; and
   sort nodes of said query graph into an order of said nodes, wherein performing said calculation comprises performing calculations in an order that corresponds to said order of said nodes, wherein sorting said nodes of said query graph comprises placing said first node before said second node in said order of said nodes.

9. The computing system of claim 8, wherein said notifying of said querying application comprises publishing changes relevant to said query result to a plurality of listeners.

10. The computing system of claim 9, wherein said plurality of listeners are to receive notifications for respective different types of changes within said full structure graph such that calculations associated with changes for said plurality of listeners can be performed without relying on a previous query result in said cache memory, wherein a first listener of said plurality of listeners is to listen for first type changes, and a second listener of said plurality of listeners is to listen for second type changes different from said first type changes.

11. The computing system of claim 8, wherein said query graph is first query graph, wherein the computer executable code when executed causes the at least one processor to:
create a second live topological query result in response to a second query graph, and
determine whether said change is relevant to said second query graph, said determining whether said change is relevant to said second query graph can be performed with an overhead below a predefined threshold without relying on any result stored in said cache memory.

12. The computing system of claim 11, wherein said first query graph is of a structure such that said calculation to determine whether said change is relevant to said first query graph involves a processing overhead complexity above said predefined threshold, and said processing overhead complexity can be reduced by caching a subset of nodes within said query result for said first query graph.

13. The computing system of claim 8, wherein said full structure graph represents an Information Technology (IT) infrastructure.

14. A non-transitory computer readable storage medium having computer readable code embodied therewith, said computer readable program code upon execution causing a computing system to:
use a query graph to create a live topological query result from a database representing an Information Technology (IT) infrastructure in graph form while not storing an entirety of said query result in a cache memory;
define a first node in said query graph as a key node for which a query result portion is to be cached;
define a second node in said query graph as a non-cached node for which a query result portion is not to be cached;
store a first query result portion of said query result including said query result portion for said key node of said query graph in said cache memory, and not store a second query result portion of said query result including said query result portion for said non-cached node of said query graph in said cache memory;
perform a calculation, based on said first query result portion stored in said cache memory and said second query result portion not stored in said cache memory, to determine whether a change within said IT infrastructure is relevant to said query result in response to detecting said change within said IT infrastructure;
publish any relevant changes to a plurality of listeners; and
with said listeners, notify a querying application of a relevant change to said query result without relying on a fully cached copy of said query result.

15. The non-transitory computer readable storage medium of claim 14, wherein a first listener of said plurality of listeners listens for first type changes, and a second listener of said plurality of listeners listens for second type changes different from said first type changes.

16. The method of claim 1, wherein performing said calculations comprises:
performing a first calculation to determine whether a first change relating to said first node is relevant to said first query result portion, and
after performing said first calculation, performing a second calculation to determine whether a second change relating to said second node is relevant to said second query result portion.

17. The non-transitory computer readable storage medium of claim 14, wherein detecting said change comprises detecting changes within said IT infrastructure, and wherein performing said calculation comprises:
performing a first calculation to determine whether a first change relating to said first node is relevant to said first query result portion, and
after performing said first calculation, performing a second calculation to determine whether a second change relating to said second node is relevant to said second query result portion.

18. The non-transitory computer readable storage medium of claim 17, wherein the computer readable program code upon execution cause the computing system to:
sort nodes of said query graph into an order of said nodes, wherein performing said first calculation and said second calculation is in an order that corresponds to said order of said nodes,
wherein sorting said nodes of said query graph comprises placing said first node before said second node in said order of said nodes.

19. The method of claim 1, further comprising:
defining the first node in said query graph as a key node for which a query result portion is to be cached;
defining second node in said query graph as a non-cached node for which a query result portion is not to be cached.

* * * * *